United States Patent [19]

Karn

[11] 4,021,419

[45] May 3, 1977

[54] BASIC METAL SALTS OF SULFUR- AND METHYLENE-BRIDGED POLY-PHENOL COMPOSITIONS, AND EPOXIDE-REACTED DERIVATIVES THEREOF, AND LUBRICANTS CONTAINING THEM

[75] Inventor: Jack Lee Karn, Cleveland Heights, Ohio

[73] Assignee: The Lubrizol Corporation, Cleveland, Ohio

[22] Filed: Sept. 4, 1975

[21] Appl. No.: 610,360

Related U.S. Application Data

[62] Division of Ser. No. 356,662, May 2, 1973, Pat. No. 3,951,830.

[52] U.S. Cl. .............................. 260/128; 260/125; 260/609 F; 252/42.7; 260/137
[51] Int. Cl.$^2$ ........................................ C07G 17/00
[58] Field of Search ............... 260/125, 137, 609 F, 260/128; 252/42.7

[56] References Cited

UNITED STATES PATENTS

| | | | |
|---|---|---|---|
| 2,451,037 | 10/1948 | McCleary et al. | 252/42.7 |
| 2,472,517 | 6/1949 | Cantrell et al. | 252/42.7 |
| 2,472,518 | 6/1949 | Cantrell et al. | 252/42.7 |
| 2,472,552 | 6/1949 | Smith et al. | 252/42.7 |
| 2,629,743 | 2/1953 | Burnette et al. | 260/609 F |
| 3,035,908 | 5/1962 | Gottshall et al. | 260/609 F |
| 3,498,936 | 3/1970 | Wilson | 260/137 |
| 3,883,501 | 5/1975 | Malec et al. | 260/125 |
| 3,903,173 | 9/1975 | Eggensperger et al. | 260/609 F |

*Primary Examiner*—Delbert R. Phillips
*Attorney, Agent, or Firm*—James W. Adams, Jr.; William H. Pittman

[57] ABSTRACT

Novel polyphenol compositions are prepared by successively reacting a phenol with formaldehyde or a reversible polymer thereof and sulfurizing the same with sulfur or a sulfur halide. The formaldehyde reaction and sulfurization may be effected in either order, but preferably the formaldehyde reaction takes place first. The resulting polyphenols are useful as oxidation inhibitors in lubricants. They may also be reacted with epoxides, and either the polyphenols or the epoxide reaction products thereof may be reacted with metal bases (especially alkali metal and alkaline earth metal bases, and preferably barium or calcium) to yield basic salts. The basic salts may also be reacted with epoxides, preferably ethylene oxide and propylene oxide. The basic salts thus obtained are useful in lubricants as detergents and oxidation inhibitors.

8 Claims, No Drawings

BASIC METAL SALTS OF SULFUR- AND METHYLENE-BRIDGED POLY-PHENOL COMPOSITIONS, AND EPOXIDE-REACTED DERIVATIVES THEREOF, AND LUBRICANTS CONTAINING THEM

This application is a division of copending application Ser. No. 356,662, filed May 2, 1973, now U.S. Pat. No. 3,951,830.

This invention relates to new compositions of matter which are useful as lubricant additives, particularly as oxidation inhibitors and detergents, and to lubricants containing them. More particularly, it relates to sulfur- and methylene-bridged polyphenol compositions prepared by (A) reacting a phenol with formaldehyde or a reversible polymer thereof and subsequently sulfurizing the methylene-bridged intermediate thus obtained, or by (B) sulfurizing said phenol and subsequently reacting the sulfurized intermediate thus obtained with formaldehyde or a reversible polymer thereof; to oil-soluble, basic metal base with said polyphenol compositions; to epoxide reaction products of said bridged polyphenols and basic phenates; and to lubricants containing any of these compositions.

Sulfurized phenols and basic metal salts thereof are valuable lubricant additives. The phenols inhibit oxidation and corrosion, and the basic salts perform those functions and also provide detergency, neutralize acids and inhibit gum formation. The acid-neutralizing ability of the metal salts is directly related to the percentage of metal base which can be incorporated therein. It is of interest, therefore, to prepare oil-soluble compositions of this sort which have a high metal content. It is also of interest to produce intermediates for such compositions, said intermediates themselves possessing oxidation inhibition and other properties useful in lubricants.

A principal object of the present invention, accordingly, is to provide novel phenolic compositions.

A further object is to provide phenolic compositions which may be converted into basic, sulfurized phenate salts.

Another object is to provide basic compositions containing a high percentage of metal.

Still another object is to provide novel compositions which are useful as lubricant additives.

Other objects will in part be obvious and will in part appear hereinafter.

As previously indicated, the polyphenol compositions of this invention are prepared by sulfurizing a phenol and reacting it with formaldehyde, these two steps being carried out successively (in either order) rather than simultaneously. The word "phenol", as used herein, denotes any hydroxyaromatic compound including hydroxy compounds derived from fused-ring hydrocarbons (e.g., naphthols and the like). Especially preferred are phenols substituted with aliphatic or cycloaliphatic radicals having at least about 6 carbon atoms and up to as many as 7000 carbon atoms. Examples of such radicals are hexyl, cyclohexyl, heptyl, decyl, eicosyl, and radicals derived from the polymerization of olefins such as ethylene, propylene, 1-butene, 2-butene, isobutene and the like. Radicals derived from polymers of propylene, 1-butene and isobutene are preferred, especially those having a molecular weight of about 150–1750 (containing about 10–125 aliphatic carbon atoms). In some instances, however, a higher molecular weight radical, e.g., one having a molecular weight of about 50,000–100,000, is desirable since such a radical can impart viscosity index improving properties to the composition.

The hydrocarbon substituent and the aryl nucleus of the phenol may contain other substituents such as hydroxy, mercapto, halogen, nitro, amino, nitroso, sulfo and disulfo radicals.

Introduction of the aliphatic or cycloaliphatic substituent onto the phenol can be effected by mixing the hydrocarbon (or a halogenated derivative thereof, or the like) and the phenol at a temperature of about 50°–200° C. in the presence of a suitable catalyst, such as aluminum trichloride, boron trifluoride, zinc chloride or the like. The radical can also be introduced by other alkylation processes known in the art. It is irrelevant which position on the phenolic ring is substituted; any single isomer, or a mixture of isomers, may be used. Polysubstituted materials such as dialkyl and trialkyl phenols may also be present, either alone or in admixture with monoalkyl phenols.

In one of the steps leading to the polyphenol compositions of this invention, the phenol (or a sulfurized intermediate prepared therefrom as described hereinafter) is reacted with formaldehyde, or with a reversible polymer thereof such as paraformaldehyde, trioxane or the like. (As used hereinafter, the word "formaldehyde" shall be deemed to include such reversible polymers.) Preferably, the reaction with formaldehyde comes first and is followed by sulfurization as described hereinafter.

The reaction between the phenol and formaldehyde or polymer thereof is usually carried out between room temperature and about 150° C., preferably about 50°–125° C. It is usually preferred to carry out the reaction in the presence of an acidic or basic material, normally a readily available acid or base such as hydrochloric acid, acetic acid, ammonium hydroxide, sodium hydroxide or potassium hydroxide. Strong organic acids such as p-toluenesulfonic acid are also suitable.

The relative proportions of the reagents used are not critical, but it is generally convenient to use about 0.3–2.0 moles of phenol per equivalent of formaldehyde. As used herein, the term "equivalent" denotes a weight amount of the reagent equal to the molecular weight thereof divided by the number of reactive sites per molecule. Thus, the equivalent weight of formaldehyde is half its molecular weight, since one mole of formaldehyde can react with two moles of a phenol; and the equivalent weight of an acid or base is its molecular weight divided by the number of acidic or basic groups therein.

The amount of acid or base used in the formaldehydephenol condensation reaction is likewise not critical, but it is usually convenient to use about 0.03–2.5 equivalents of acid or base per equivalent of formaldehyde.

The reaction between the phenol and formaldehyde may be carried out in the absence of a diluent, but it is often convenient to use a suitable diluent, typically a substantially inert organic one such as mineral oil or an alcohol, ketone, ether, ether alcohol or the like.

Sulfurization is the other reaction contemplated in the preparation of the polyphenol compositions of this invention. The sulfurizing agent is ordinarily elemental sulfur or a halide thereof such as sulfur monochloride or (preferably) sulfur dichloride.

The sulfurization reaction is effected by heating the phenol, or formaldehyde-reacted intermediate, with the sulfurizing agent at about 50°–250° C. and usually at least about 160° C. if sulfur is used, optionally in the presence of a suitable diluent such as those recited hereinabove, for a period of time sufficient to effect substantial reaction. It is generally preferred to employ about 0.5–2.5 moles of phenol (or phenolic intermediate) per equivalent of sulfurizing agent. The equivalent weight of a sulfur halide is considered to be half its molecular weight, since one mole thereof reacts with two moles of phenol or the like. However, the equivalent weight of sulfur is considered to be equal to its molecular weight since the stoichiometry of the simplest reaction is

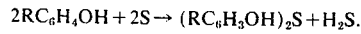

$$2RC_6H_4OH + 2S \rightarrow (RC_6H_3OH)_2S + H_2S.$$

Particularly if a sulfur halide is used as the sulfurizing agent, it is frequently preferred to use an acid acceptor such as sodium hydroxide, sodium acetate or the like to react with the hydrogen halide evolved.

The molecular structure of the product formed by sulfurization of and formaldehyde reaction with the phenol is not known with certainty, but it is believed to be a sulfur- and methylene-bridged polyphenol. This product, as well as the intermediate formed by either step taken by itself, generally need not be isolated but may be used as an intermediate or a lubricant additive in the form in which obtained. However, if a volatile diluent is used in the preparation it should generally be removed by a suitable method such as distillation, typically under vacuum, or by volatilization with a stream of inert gas such as nitrogen. If desired, the intermediate or product may be isolated by the usual methods.

The basic, sulfurized metal phenates of this invention are prepared by reacting the above-described sulfur- and methylene-bridged polyphenol compositions with an excess of a metal base. The metal base is usually an alkali or alkaline earth metal base such as sodium hydroxide, potassium hydroxide, magnesium hydroxide, calcium hydroxide, barium hydroxide, calcium alkoxides and the like. The preferred bases are the oxides and hydroxides, and the preferred metals are barium and calcium.

The amount of metal base added to the reaction mixture varies according to the metal ratio desired in the product. (The term "metal ratio" is defined as the ratio of the total number of equivalents of metal in the basic salt to the number required to produce a normal salt. Thus, a metal ratio of 2 indicates the salt contains twice as much metal as the normal salt.) For example, if a metal ratio of 4 is desired at least 4 times the stoichiometric amount of metal base necessary to prepare the normal salt should be used.

It is usually preferred to employ at least one promoter in the preparation of the basic salt. Typical promoters are alcohols, phenols, amines, carboxylic acids and salts and anhydrides thereof, aliphatic nitro compounds, water and the like. Others are described in numerous patents and will be readily apparent to those skilled in the art. Especially useful are $C_{1-6}$ alcohols, carboxylic acids containing about 5 carbon atoms or less and salts thereof, high molecular weight hydrocarbon-substituted succinic acids and anhydrides and mixtures of these compounds. The substituted succinic acids and anhydrides also improve oil solubility of the basic salt.

The amount of promoter to be used in the reaction mixture depends on the amount of metal base and is usually about 0.02–0.2 equivalent per equivalent of the metal base.

The preparation of the basic salt is normally effected in a diluent, typically mineral oil. Other diluents, especially aromatic hydrocarbons, may be used. The reaction temperature is usually between about room temperature and 100° C., although this temperature is not critical.

It is often desirable to further react the basic composition with carbon dioxide. This carbonation may be effected merely by passing carbon dioxide into the mixture at a temperature between room temperature and about 180° C. Alternatively, the polyphenol or normal salt thereof may be reacted with carbon dioxide in the presence of excess metal base and one or more promoters.

After the reaction is complete (with or without carbonation), the volatile constituents are removed from the reaction mixture as described above.

It is frequently found that the rust inhibiting properties of lubricants containing the compositions of this invention are improved if the compositions (either the polyphenols or the basic metal salts thereof) are reacted with at least one epoxide of up to about 30 carbon atoms such as ethylene oxide, propylene oxide, allyl glycidyl ether, butyl epoxystearate and the like. Lower alkylene oxides of up to 7 carbon atoms, preferably ethylene oxide and propylene oxide and especially the latter, are preferred. The epoxide reaction is conveniently carried out merely by adding the epoxide slowly to the composition, typically maintaining a temperature of about 50°–125° C. The ratio of epoxide to polyphenol or basic salt thereof is not critical, but best results are obtained when at least about 0.4 equivalent of epoxide per mole of phenol or phenol salt is employed. As indicated, the epoxide may be reacted with either the polyphenol or the salt thereof, and if it is reacted with the polyphenol the epoxide-treated composition may subsequently be converted to a basic salt.

The preparation of the compositions of this invention is illustrated by the following examples. All parts are by weight.

EXAMPLE 1

A sulfurized phenol is prepared by adding one mole of sulfur dichloride to 2 moles of tetrapropene-substituted phenol at 100°–105° C., over 2 hours. The mixture is heated for an additional hour and blown with nitrogen.

To a solution of 1590 parts (10 equivalents) of the resulting sulfurized phenol in 1590 parts of mineral oil are added, at 50° C., 225 parts (15 equivalents) of paraformaldehyde and 75 parts of commercial aqueous ammonia. The mixture is heated for 3 hours at 95° C., and then for 3 hours at 150°–160° C. to remove volatiles. A filter aid material is added and the product is filtered at 160° C. The filtrate is the desired product obtained as a 48.5% solution in oil; it contains 2.7% phenolic hydroxyl.

EXAMPLE 2

A sulfurized phenol is prepared by heating 1000 parts of tetrapropene-substituted phenol with 194 parts of sulfur dichloride and 160.5 parts of sodium hydroxide, in 400 parts of mineral oil.

To 5380 parts (12 equivalents) of the above-described sulfurized phenol in 1100 parts of mineral oil is added at 65° C., with stirring, 360 parts (9 equivalents) of 37% aqueous formaldehyde solution, followed by a solution of 156 parts (2.4 equivalents) of potassium hydroxide in 240 parts of water. The mixture is heated under reflux for 2 hours, and then 240 parts (2.4 equivalents) of 37% aqueous hydrochloric acid is added. Removal of volatiles is continued at 150° C. under vacuum, and then a filter aid material is added and the hot oil solution is filtered. The filtrate is the desired product, obtained as a 73% solution in mineral oil.

EXAMPLES 3–5

Following substantially the procedure of Example 2, reaction products are obtained by the reaction of formaldehyde with a sulfurized tetrapropene-substituted phenol in the presence of hydrochloric acid, p-toluenesulfonic acid and acetic acid, respectively. In Examples 3 and 5, volatiles are stripped without nitrogen blowing; in Example 4, nitrogen is used. The products are obtained as approximately 60% solutions in mineral oil.

EXAMPLE 6

A solution of 2330 parts (6 equivalents) of a sulfurized tetrapropene-substituted phenol similar to that of Example 2, except that inorganic salts have been removed by filtration, in 1500 parts of isopropanol is stirred at room temperature and an aqueous solution of 264 parts (6.3 equivalents) of sodium hydroxide is added. The mixture is stirred for 3 hours and then 729 parts (18 equivalents) of 30% aqueous formaldehyde is added. The mixture is allowed to stand for three days and is neutralized with 402 parts (6.7 equivalents) of acetic acid. The organic layer is washed 3 times with water and filtered, with the addition of a filter aid. Benzene is then added and the water is removed as a benzene-water azeotrope under vacuum at 50° C., with other volatiles being simultaneously removed. The residue is the product; it contains 7.25% phenolic hydroxyl.

EXAMPLE 7

A polyisobutene-substituted phenol wherein the polyisobutene substituent has a molecular weight of about 300 (2450 parts, 5 equivalents) is heated to 60° C. and 75 parts (5 equivalents) of paraformaldehyde and 50 parts of commercial aqueous ammonia are added. The mixture is stirred for 5 hours at 85°–100° C. and is then heated to 160° C. to remove volatiles. It is cooled to 75° C. and 258 parts (10 equivalents) of sulfur dichloride is added dropwise at 75°–110° C. After hydrogen chloride evolution has ceased, the mixture is blown with nitrogen at 150° C. for several hours, after which a filter aid is added and the mixture is filtered. Mineral oil is added to provide a 75% mineral oil solution of the desired product; this solution contains 1.87% sulfur and 2.07% phenolic hydroxyl.

EXAMPLE 8

A solution of 3192 parts (12 equivalents) of a polyisobutene-substituted phenol, wherein the polyisobutene substituent has a molecular weight of about 175, in 2400 parts of mineral oil is heated to 70° C. and 502 parts (12 equivalents) of solid sodium hydroxide is added. The material is blown with nitrogen at 162° C. under vacuum to remove volatiles and is then cooled to 125° C., and 465 parts (12 equivalents) of 40% aqueous formaldehyde is added. The mixture is heated to 146° C. under nitrogen, and volatiles are finally removed again under vacuum. Sulfur dichloride, 618 parts (6 equivalents), is then added over 4 hours. Water, 1000 parts, is added at 70° C. and the mixture is heated to reflux for 1 hour. All volatiles are then removed under vacuum at 155° C. and the residue is filtered at that temperature, with the addition of a filter aid material. The filtrate is the desired product (59% solution in mineral oil) containing 3.56% phenolic hydroxyl and 3.46% sulfur.

EXAMPLE 9

Following the procedure of Example 8, a product (61% solution in mineral oil) containing 3.08% phenolic hydroxyl and 3.07% sulfur is obtained from 1330 parts (5 equivalents) of the polyisobutene-substituted phenol, 1000 parts of mineral oil, 219 parts (5.25 equivalents) of sodium hydroxide, 165 parts (10 equivalents) of paraformaldehyde, 257 parts (2.5 equivalents) of sulfur dichloride and 500 parts of water.

EXAMPLE 10

Formaldehyde (30% aqueous), 199 parts (5 equivalents), is added at 45° C. to a solution of 1330 parts (5 equivalents) of the polyisobutene-substituted phenol of Example 8 in 500 parts of mineral oil. The mixture is heated under reflux for 3 hours and volatiles are then removed by heating to 150° C. Sodium hydroxide (50% aqueous solution), 80 parts (1 equivalent), is added at 80° C. and the mixture is again stripped, this time under vacuum. It is then cooled to 80° C. and 160 parts (5 equivalents) of sulfur is added. The mixture is heated for about 22 hours at 180° C. and is then neutralized with hydrochloric acid at 80° C. The neutralized mixture is washed with 500 parts of toluene and water is removed by distillation. The residue is filtered, using a filter aid material and washing with toluene, and the filtrate is again stripped of volatiles under vacuum. Mineral oil is added to provide an oil solution (74% in oil) of the desired product; the solution contains 3.23% sulfur.

EXAMPLE 11

A product is prepared substantially according to the procedure of Example 3, and 3600 parts (7.39 equivalents) thereof is mixed with 1553 parts of mineral oil. The mixture is heated to 59° C. and there are added 1248 parts of methanol, 142 parts of acetic acid, 230 parts of a polyisobutenyl succinic anhydride wherein the polyisobutenyl radical has a molecular weight of about 1000, and 602 parts (16.27 equivalents) of calcium hydroxide. The mixture is digested for 6 minutes and carbon dioxide is introduced beneath the surface of the liquid for 2 hours. The mixture is then heated to 160° C. with nitrogen blowing, to remove volatiles, a filter aid is added and the mixture is filtered. The filtrate, which is the desired product, contains 1.70% sulfur and 17.49% calcium sulfate ash.

EXAMPLE 12

An intermediate is prepared substantially according to the method of Example 3, except that the ratio of equivalents of phenol to formaldehyde is 1:1. To a mixture of 3600 parts (7.39 equivalents) of this intermediate, 1553 parts of mineral oil and 230 parts of the polyisobutenyl succinic anhydride of Example 11, at 62° C., are added 142 parts of acetic acid, 1248 parts of methanol and 602 parts (16.27 equivalents) of calcium hydroxide. The mixture is stirred for one hour and then blown with carbon dioxide for 2½ hours. Volatile materials are then removed by nitrogen blowing at 150° C. Benzene, 2500 parts, is added and the mixture is filtered with the addition of a filter aid material. The benzene is removed by nitrogen blowing at 150° C. and subsequent vacuum stripping. Additional filter aid is then added and the product is again filtered while hot; the filtrate is a 74% solution in mineral oil of the desired product and contains 1.81% sulfur and 17.13% calcium sulfate ash.

EXAMPLE 13

A mixture of 319.2 parts (1.2 equivalents) of a tetrapropene-substituted phenol similar to that used in Example 8, 240 parts of mineral oil and 45 parts (0.6 equivalent) of 40% aqueous formaldehyde solution is heated to 70° C., with stirring, and 100.5 parts (1.26 equivalents) of 50% aqueous sodium hydroxide is added over about 20 minutes, while the mixture is blown with nitrogen. Volatile materials are removed by stripping at 160° C., with nitrogen blowing and subsequently under vacuum. Sulfur dichloride, 61.8 parts (1.2 equivalents), is added below the surface of the liquid at 140° – 150° C., over 6 hours. The mixture is then heated at 145° C. for one hour and volatile materials are removed by stripping under nitrogen at 160° C.

The intermediate thus obtained is filtered with the addition of a filter aid material, and 3600 parts (7.39 equivalents) thereof is combined with 1553 parts of mineral oil and 230 parts of the polyisobutenyl succinic anhydride of Example 11. The mixture is heated to 67° C. and there are added 142 parts of acetic acid, 1248 parts of methanol and 602 parts (16.27 equivalents) of calcium hydroxide. The mixture is digested for a few minutes and then blown with carbon dioxide at 60°– 65° C. The carbon dioxide-blown material is stripped at 160° C. to remove volatiles and finally filtered with the addition of a filter aid. The filtrate is the desired product containing 1.68% sulfur and 16.83% calcium sulfate ash.

EXAMPLE 14

To a mixture of 3192 parts (12 equivalents) of tetrapropenyl-substituted phenol, 2400 parts of mineral oil and 465 parts (6 equivalents) of 40% aqueous formaldehyde at 82° C., is added, over 45 minutes, 960 parts (12 equivalents) of 50% aqueous sodium hydroxide. Volatile materials are removed by stripping as in Example 13, and to the residue is added 618 parts (12 equivalents) of sulfur dichloride over 3 hours. Toluene, 1000 parts, and 1000 parts of water are added and the mixture is heated under reflux for 2 hours. Volatile materials are then removed at 180° C. by blowing with nitrogen and the intermediate is filtered.

To 1950 parts (4 equivalents) of the intermediate thus obtained is added 135 parts of the polyisobutenyl succinic anhydride of Example 11. The mixture is heated to 51° C., and 78 parts of acetic acid and 431 parts of methanol are added, followed by 325 parts (8.8 equivalents) of calcium hydroxide. The mixture is blown with carbon dioxide and is finally stripped with nitrogen blowing at 158° C. and filtered while hot, using a filter aid. The filtrate is a 68% solution in mineral oil of the desired product and contains 2.63% sulfur and 22.99% calcium sulfate ash.

EXAMPLE 15

A basic calcium-containing composition is prepared according to the method of Example 13. To 667.5 parts (0.8 equivalent) of this composition, at 120° C., is added 46.4 parts (0.8 equivalent) of propylene oxide over 1¼ hours, with stirring. The addition rate is established so as to provide gentle reflux. Following the propylene oxide addition, the mixture is heated to 150° C.; a filter aid material is then added and the mixture is filtered. The filtrate is the desired product containing 1.8% sulfur and 16.22% calcium sulfate ash.

EXAMPLE 16

To 6656 parts (8 equivalents) of a composition prepared according to the method of Example 11 is added over 2 hours at 149° C. 232 parts (4 equivalents) of propylene oxide. The material is externally cooled to 100° C. while being blown with nitrogen. A filter aid material is then added and the material is filtered; the filtrate is the desired product containing 1.77% sulfur and 16.55% calcium sulfate ash.

EXAMPLES 17–21

Following the procedure of Example 15, products are prepared from 3000 parts of a product prepared by the method of Example 13 and 60, 90, 120, 150 and 180 parts, respectively, of propylene oxide.

EXAMPLE 22

To 914 parts (2 equivalents) of a product prepared according to the method of Example 8, at 60° C., is added 20 parts (0.5 equivalent) of sodium hydroxide. The material is heated to 150° 1 C. and stripped of volatiles by nitrogen blowing. Ethylene oxide, 88 parts (2 equivalents), is then added over 1 hour at 140°–160° C., using nitrogen as a carrier gas. The material is allowed to cool overnight and is then heated to 80° C. and 50 parts (0.5 equivalent) of hydrochloric acid is added. The mixture is heated under reflux for one hour, stripped of volatiles and filtered, using a filter aid material. The product contains 3.04% sulfur and 3.8% phenolic hydroxyl.

As previously mentioned, the polyphenol compositions of this invention (and epoxide reaction products therewith) are useful as oxidation inhibitors, and the basic salts thereof (and epoxide reaction products therewith) as detergents and oxidation inhibitors, in lubricants. As such, they can be employed in a variety of lubricating compositions based on diverse oils of lubricating viscosity, including natural and synthetic lubricating oils and mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metalworking lubricants, hydraulic fluids, and other lubricating oil and grease compositions can benefit from the incorporation of the present compositions.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils iclude hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkylbenzenes (e.g., dodecylbenzenes, tetradecylbenzenes, dinonylbenzenes, di-(2-ethylhexyl) benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$-$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like. Silicon-based oils such as the polyalkyl-, polyaryl-, polyalkoxy- or polyaryloxy-siloxane oils and silicate oils comprise another useful class of synthetic lubricants (e.g., tetraethyl silicate, tetraisopropyl silicate, tetra-(2-ethylhexyl) silicate, tetra-(4-methyl-2-tetraethyl) silicate, tetra-(p-tert-butylphenyl) silicate, hexyl-(4-methyl-2-pentoxy)-disiloxane, poly(methyl)-siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

In general, about 0.05–20.0 parts (by weight) of the composition of this invention is dissolved in 100 parts of oil to produce a satisfactory lubricant. The invention also contemplates the use of other additives in combination with the products of this invention. Such additives include, for example auxiliary detergents and dispersants of the ash-containing or ashless type, auxiliary oxidation inhibiting agents, pour point depressing agents, extreme pressure agents, color stabilizers and anti-foam agents.

The auxiliary ash-containing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorous heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

Ashless detergents and dispersants are illustrated by the interpolymers of an oil-solubilizing monomer, e.g., decyl methacrylate, vinyl decyl ether, or high molecular weight olefin, with a monomer containing polar substituents, e.g., aminoalkyl acrylate or poly-(oxyethylene)-substituted acrylate; the amine salts, amides, and imides of oil-soluble monocarboxylic or dicarboxylic acids such as stearic acid, oleic acid, tall oil acid, and high molecular weight alkyl or alkenyl-substituted succinic acid. Especially useful as ashless detergents are the acylated polyamines and similar nitrogen compounds containing at least about 54 carbon atoms as described in U.S. Pat. No. 3,272,746; reactionproducts of such compounds with other reagents including boron compounds, phosphorus compounds, epoxides, aldehydes, organic acids and the like; and esters of hydrocarbon-substituted succinic acids as described in U.S. Pat. No. 3,381,022.

Extreme pressure agents and corrosion-inhibiting and auxiliary oxidation-inhibiting agents are exemplified by chlorinated aliphatic hydrocarbons such as chlorinated wax; organic sulfides and polysulfides such as benzyl disulfide, bis(chlorobenzyl) disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl) phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

It is possible to form the lubricants of this invention by dissolving the various additives, or oil solutions thereof, directly in a mineral oil. However, it is generally more convenient and is preferred to prepare additive concentrates comprising a diluent (typically mineral oil) and one or more of the desired additives, the latter comprising up to about 90% by weight of the concentrate, and to dissolve these concentrates in mineral oil to form the final lubricating composition.

Typical lubricating compositions according to this invention are listed in Tables I and II. All amounts listed, except those for mineral oil, are exclusive of oil present as diluent.

TABLE I

| Lubricant | Parts by weight | | | |
|---|---|---|---|---|
| | A | B | C | D |
| Mineral oil (SAE 30 base) | — | 86.74 | 85.17 | 91.86 |
| Mineral oil (SAE 40 base) | 95.20 | — | — | — |

TABLE I-continued

| Lubricant | Parts by weight | | | |
|---|---|---|---|---|
| | A | B | C | D |
| Product of Example 1 | 4.00 | 4.00 | — | — |
| Product of Example 7 | — | — | 6.28 | — |
| Product of Example 13 | — | — | — | 5.00 |
| Calcium petroleum sulfonate (slightly basic) | 0.47 | — | — | — |
| Basic calcium petroleum sulfonate | — | — | — | 1.01 |
| Calcium salt of heptylphenol-formaldehyde reaction product | 0.33 | — | — | — |
| Polyisobutenyl succinic anhydride | — | — | — | 0.08 |
| Reaction product of polyisobutenyl succinic anhydride with polyethylene polyamine mixture | — | 2.50 | 8.55 | 1.25 |
| Reaction product of propylene oxide with polyisobutenyl-phenol sulfide | — | 3.99 | — | — |
| Zinc salt of mixture of isobutyl- and primary amylphosphorodithioic acids | — | 0.41 | — | 0.30 |
| Zinc salt of mixture of isooctyl-phosphorodithioic acid and acidic phosphosulfurized polyisobutene | — | 2.36 | — | — |
| Silicone anti-foam agent | — | 0.009 | 0.003 | 0.509 |

TABLE II

| Lubricant | Parts by weight | | | | | |
|---|---|---|---|---|---|---|
| | E | F | G | H | J | K |
| Mineral oil (SAE 30 base) | — | 90.63 | 90.71 | 91.61 | 91.23 | 91.34 |
| Mineral oil (SAE 10W-30 base) | 93.11 | — | — | — | — | — |
| Product of Example 8 | 1.00 | — | — | — | — | — |
| Product of Example 12 | — | 3.86 | — | — | — | — |
| Product of Example 13 | — | — | 3.77 | — | — | — |
| Product of Example 14 | — | — | — | 2.87 | — | — |
| Product of Example 15 | — | — | — | — | 4.07 | — |
| Product of Example 16 | — | — | — | — | — | 4.00 |
| Basic calcium petroleum sulfonate | 0.74 | 0.56 | 0.56 | 0.56 | 0.56 | 0.56 |
| Reaction product of polyisobutenyl succinic anhydride with polyethylene polyamine mixture | 0.06 | — | — | — | — | — |
| Pentaerythritol ester of polyisobutenyl succinic acid | 2.40 | 2.92 | 2.92 | 2.92 | 2.92 | 2.94 |
| Polyacrylate viscosity index improver | 1.77 | — | — | — | — | — |
| Interpolymer of vinyl acetate, ethyl vinyl ether and $C_{13-14}$ fumarate | 0.09 | — | — | — | — | — |
| Zinc salt of tetrapropenylphenylphosphorodithioic acid | — | 2.03 | 2.04 | 2.04 | — | — |
| Zinc salt of heptylphenylphosphorodithioic acid | — | — | — | — | 0.81 | — |
| Zinc salt of isooctylphosphorodithioic acid | — | — | — | — | — | 1.16 |
| Zinc salt of mixture of isobutyl- and primary amylphosphorodithioic acids | 0.83 | — | — | — | 0.41 | — |
| Silicone anti-foam agent | 0.004 | 0.01 | 0.01 | 0.01 | 0.01 | 0.01 |

What is claimed is:

1. An oil-soluble composition prepared by reacting, at a temperature of about 50°-125° C., an epoxide with an oil-soluble, basic metal phenate, said phenate being prepared by reacting an excess of a metal base with a sulfur- and methylene-bridged polyphenol composition which is in turn prepared by (A) reacting a phenol with formaldehyde or a reversible polymer thereof and subsequently sulfurizing the methylene-bridged intermediate thus obtained, or by (B) sulfurizing said phenol and subsequently reacting the sulfurized intermediate thus obtained with formaldehyde or a reversible polymer thereof; the sulfurizing agent being sulfur or a halide thereof; at least about 0.4 equivalent of epoxide being employed per mole of phenate.

2. A composition according to claim 1 wherein the metal of said metal base is an alkali metal or an alkaline earth metal.

3. A composition according to claim 2 wherein the epoxide is ethylene oxide or propylene oxide.

4. A composition according to claim 3 wherein the phenol is substituted with an aliphatic, cycloaliphatic or substituted aliphatic or cycloaliphatic radical having at least 6 carbon atoms.

5. A composition according to claim 4 wherein the metal of said metal base is barium or calcium.

6. A composition according to claim 5 wherein the phenol substituent is derived from a polymer of propylene, 1-butene or isobutene.

7. A composition according to claim 6 wherein the phenol substituent has a molecular weight of about 150-1750.

8. A composition according to claim 7 wherein the epoxide is propylene oxide.

* * * * *